US010066692B2

(12) United States Patent
Sandberg (10) Patent No.: US 10,066,692 B2
(45) Date of Patent: Sep. 4, 2018

(54) BRAKE ACTUATION MECHANISM FOR A DISC BRAKE AND DISC BRAKE COMPRISING THE SAME

(71) Applicant: Haldex Brake Products AB, Landskrona (SE)

(72) Inventor: Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 15/301,904

(22) PCT Filed: Apr. 4, 2014

(86) PCT No.: PCT/EP2014/056880
§ 371 (c)(1),
(2) Date: Oct. 4, 2016

(87) PCT Pub. No.: WO2014/106672
PCT Pub. Date: Jul. 10, 2014

(65) Prior Publication Data
US 2017/0122394 A1    May 4, 2017

(51) Int. Cl.
*F16D 55/02* (2006.01)
*F16D 65/18* (2006.01)
(Continued)

(52) U.S. Cl.
CPC ........... *F16D 65/18* (2013.01); *F16D 65/567* (2013.01); *F16D 2125/28* (2013.01); *F16D 2125/582* (2013.01)

(58) Field of Classification Search
CPC .. F16D 65/18; F16D 65/567; F16D 2125/582; F16D 55/227; F16D 65/0043; F16D 2121/14; F16D 2125/28
(Continued)

(56) References Cited

U.S. PATENT DOCUMENTS 4,321,986 A * 3/1982 Thistleton ............. F16D 65/567
188/196 F
4,527,683 A   7/1985 Mathews
(Continued)

FOREIGN PATENT DOCUMENTS

EP        0271864 A2    6/1988
EP        0553105 B1    11/1994
(Continued)

*Primary Examiner* — Pamela Rodriguez
(74) *Attorney, Agent, or Firm* — St. Onge Steward Johnson and Reens LLC (57) ABSTRACT

A brake actuation mechanism for a disc brake including an amplification mechanism, an adjustment mechanism, a thrust element and a return mechanism, which are mountable inside a caliper housing by way of a rod so as to be functionally interacting, in which the adjustment mechanism includes a torque limiting clutch mechanism drivingly connecting several elements and including a first clutch element drivingly connecting a rotatable input element with a rotatable output element and a second clutch element connecting the rotatable output element with the rod, the rotatable output element radially surrounding the first clutch element and the second clutch element. A disc brake including such brake actuation mechanism is also contemplated.

18 Claims, 3 Drawing Sheets

(51) Int. Cl.
*F16D 65/56* (2006.01)
*F16D 125/58* (2012.01)
*F16D 125/28* (2012.01)

(58) Field of Classification Search
USPC ..... 188/71.8, 71.9, 72.8, 73.1, 196 V, 196 F, 188/196 R
See application file for complete search history.

(56) References Cited

U.S. PATENT DOCUMENTS

| | | | | |
|---|---|---|---|---|
| 4,699,253 A | * | 10/1987 | Sauvee | F16D 65/567 188/196 D |
| 4,721,190 A | * | 1/1988 | Schmidt | F16D 65/18 188/196 D |
| 5,123,505 A | * | 6/1992 | Antony | F16D 65/567 188/196 D |
| 5,788,022 A | * | 8/1998 | Antony | F16D 65/18 188/196 D |
| 2005/0284709 A1 | * | 12/2005 | Sandberg | F16D 65/0043 188/72.1 |
| 2013/0008749 A1 | * | 1/2013 | Sandberg | F16D 55/227 188/71.8 |

FOREIGN PATENT DOCUMENTS

| | | |
|---|---|---|
| EP | 0698749 B1 | 4/2000 |
| EP | 1972825 A1 | 9/2008 |
| WO | 0175324 A1 | 10/2001 |
| WO | 2004059187 A1 | 7/2004 |
| WO | 2011113554 A2 | 9/2011 |

\* cited by examiner

Fig. 2

BRAKE ACTUATION MECHANISM FOR A DISC BRAKE AND DISC BRAKE COMPRISING THE SAME

FIELD OF THE INVENTION

The present invention relates to a brake actuation mechanism for a disc brake and to a disc brake, in particular for an utility vehicle, which comprises such brake actuation mechanism.

BACKGROUND OF THE INVENTION

In this connection the invention shall include disc brakes which either comprise a sliding caliper or a fixed caliper, which overlap one or more brake discs. Mainly but not exclusively the invention relates to disc brakes with lining sections of the spot-type.

Disc brakes, in particular for heavy load trucks, are known with different configurations, both with respect to the type of the actuation mechanism, with respect to the way of the transmission of the braking or clamping force onto one or several brake discs and with respect to the type of the adjustment for compensating the wear of the brake pad and/or the brake disc.

Generally, there exists a wide range of actuation mechanism and brake adjuster designs applied and embodied in disc brakes.

For example, from EP 0 271 864 B1 an actuation device is known which comprises an axial actuation member around which several components are arranged such as a force amplification mechanism in the form of a roller-ramp mechanism. Commonly used actuation mechanisms do embody brake levers which are actuated by hydraulic, pneumatic or electro-mechanic actuators, which lever is transmitting the introductory force usually by means of one or more roller elements to a thrust piece, which is mainly axially guided in the housing of the brake caliper towards the brake disc. Such lever-actuated brake mechanisms are e.g. known from EP 0 553 105 B1 or EP 0 698 749 B1.

An alternative design of a brake actuation mechanism is shown in WO 2001/075324 A1, in which the thrust element for transferring the clamping force onto the brake disc is arranged around a central rod. A similar design is e.g. known from WO 2004/059187 A1 of the applicant. The brake actuation mechanism for a disc brake as disclosed therein comprises the shape of one single tappet and thrust element, respectively, which acts onto the brake disc, in which an adjustment device is already integrated within the tappet. The tappet thereby is mounted in the housing of the brake caliper in parallel to the rotary axis of the brake disc by means of a rod. According to a preferred embodiment the tappet directly cooperates with a return mechanism for the thrust element, which is integrated in the tappet and which cooperates with the rod.

Independent from the design of the actuation mechanism to be employed in this connection, a compensation of the running clearance between the brake disc and the brake lining at the brake pad, which results from the wear at the brake pad lining and/or at the brake disc, has to be always provided. The brake actuation mechanism according to this example of a tappet as mentioned herein at least comprises a thrust element which transmits the clamping force onto the brake disc by means of the brake pads. For that purpose the thrust element comprises at least one rotatable element which interacts with a further element, in which the latter element is guided in the brake caliper in a non-rotatable manner, however axially displaceable, so that both elements can be axially displaced in relation to each other.

By means of an adjustment mechanism having at least one clutch element, which comprises some degree of lost motion, in which the level of free motion is selected to correspond to the desired target clearance, i.e. the maximum allowable running clearance, the friction lining of the brake pad, e.g. the brake pad itself, will be progressively advanced towards the brake disc as the friction lining slowly decreases due to wear. Namely, if the friction linings do wear to such an extent that the running clearance is greater than the target clearance, the existing running clearance between the brake pad and the brake disc is taken up and the further additional movement of the brake pad towards the brake disc, which results from and thus corresponds to the actually existing excessive lining wear, causes the clutch to rotate, which rotation will advance the brake pad towards the brake disc. After contact of the brake pad with the brake disc, the increased load in the entire brake mechanism will cause the clutch to slip, thereby preventing further, now not required adjustment movements or any overloading of the adjustment mechanism.

As an example such principle is realized by WO 2011/113554 A2 of the applicant in which two sleeve-like spindles are in a threaded engagement, in which an external sleeve having an internal thread receives an internal sleeve having an external thread in a rotational manner. The external sleeve or outer spindle is supported in the brake caliper or in its carrier in a non-rotatable way, so that rotation of the internal sleeve or inner spindle results in a linear displacement of the outer spindle in relation thereto, so that the outer spindle can be moved towards the brake disc in order to compensate the wear-induced clearance at the brake linings. For example, the non-rotatable linear guidance of the outer spindle in axial direction can be realized in that the outer spindle is connected either directly or by means of further intermediate elements with the brake pad or the brake lining retainer, which in turn themselves are guided in the brake caliper or in the caliper carrier in a linear manner.

The single tappet-type actuation mechanism as known from WO 2011/113554 A2 shows an enhanced design, in which the elements of the return mechanism and the adjustment mechanism are incorporated into the tappet design and surrounded by the unit consisting of the outer and inner sleeves, which both form part of the adjustment mechanism and thus the brake actuation mechanism. The adjustment mechanism incorporated therein is driven by the rotatable lever, which introduces the clamping force into the brake actuation mechanism. Furthermore, the adjustment mechanism comprises a torque limiting clutch mechanism slipping or overrunning when the rotational resistance between the threaded parts rises due to the axial force, which is built up when the brake pad contacts the brake disc, thereby creating some kind of counter-torque. The torque-limiting clutch mechanism may be configured as a roller-ramp mechanism. In addition, an one-way clutch element may be provided, over which the torque from the lever will be transmitted in its driving direction.

For automatic brake adjusters it is furthermore known to combine the torque limiting clutch function with an one-way clutch function in one component, as this, for example, is known from U.S. Pat. No. 4,527,683, which discloses a wrap spring which comprises a double function, namely meaning that it is configured to provide a torque limiting clutch function on the one hand and an one-way clutch function on the other, which in fact is achieved in that at one end of the wrap spring the inner contour or section of it applies the one function, either the torque limiting function or one-way function, while at the other end of it its outer contour or section applies the other function, accordingly.

The advantage to combine these two functions by one element, however, is accompanied by the drawback that a rather large friction torque in the free-running direction of the section aiming at the one-way clutch function has to be provided which is due to the fact that the dimensions of the wire used for winding the wrap spring have to be selected to be rather large, so that a high enough and well defined driving torque at brake actuation can be transmitted in any case.

Furthermore, in principle, it is required that the friction torque in the free running direction of rotation for the one-way clutch function should be less than the frictional resistance resulting from all other moveable members of the adjustment mechanism in order to avoid any backward rotation of the adjustment mechanism at brake release.

In fact, at brake release, i.e. when the brake pad loses contact with the brake disc and no more braking force is transferred from the actuation mechanism to the brake disc, automatic brake adjusters, which do employ the aforementioned double function wrap spring, under certain circumstances could then tend to rotate in the other direction for some small degree, which could lead to the effect that the adjustment mechanism will drive some components of the brake actuation mechanism, in particular the outer sleeve, backwards again to some, even though small extent.

Accordingly, there exists the drawback that the slack, which corresponds to a decrease of the wear-induced distance between the brake disc and the brake pad/lining, as previously set by the adjustment mechanism during brake actuation will be again increased, even though to a minor extent as compared to the clearance reduction, by the return motion inherently resulting from the torque limiting clutch mechanism. The problem of some undesired backlash motion, anyway, more or less exists for all kind of automatic brake adjusters in the prior art.

It may be possible to lower such tendency of backlash motion applied by the wrap spring during brake release by tilting the wire of a rectangular section or by grinding down the wire sections at one end. However, considering the forces and torques being present in disc brakes such measures usually have proven to be not enough, so that there may be the further need to introduce an extra friction resistance somewhere between components of the adjustment mechanism or of the brake actuation mechanism which are moveable relative to each other. In turn, however, such increase of the inherent frictional resistance in the mechanism would again require a higher driving torque from the entire torque limiting clutch mechanism, which may call for larger wire dimensions, which, however, will then counteract the need to have a free-running torque in the one-way clutch section of the wrap spring which shall be as low as possible.

SUMMARY OF THE INVENTION

It is therefore an object of the present invention to provide an enhanced brake actuation mechanism preferably of the single tappet design as described above comprising an adjustment mechanism, in which particularly the aforementioned drawback of undesired reverse motion of the adjuster is eliminated. The newly developed brake actuation mechanism shall be more cost-efficient to produce, to install and to maintain and shall be more compact in design and shall provide a more reliable functioning.

According to the invention a first embodiment of a brake actuation mechanism for a disc brake comprising a brake caliper, which straddles at least one brake disc, is provided the brake actuation mechanism comprising:
  an amplification mechanism for amplifying a clamping force being introduced into the brake actuation mechanism;
  an adjustment mechanism for compensating wear;
  a thrust element for transmitting the amplified clamping force onto the brake disc; and
  a return mechanism;
  in which the amplification mechanism, the adjustment mechanism, the thrust element and the return mechanism are mountable inside the housing of the brake caliper by means of a rod so as to be functionally interacting, the rod being adapted to be supported in the housing of the caliper in an axially fixed and non-rotatable manner; and
  in which the adjustment mechanism comprises a torque limiting clutch mechanism and elements being coaxially and rotatably arranged around the rod, which elements are at least partly drivingly connected by the torque limiting clutch mechanism; furthermore in which the torque limiting clutch mechanism comprises a first clutch element drivingly connecting a rotatable input element with a rotatable output element and a second clutch element connecting the rotatable output element with the rod, the rotatable output element radially surrounding the first clutch element and the second clutch element.

The rotatable input element could be configured as a hollow shaft which is rotatably supported on the rod and which will be directly or indirectly set into rotation by the swiveling motion of the brake lever upon brake actuation.

The rotatable output element could be configured as a clutch sleeve having individually defined diameters so as to best surround or encase the first clutch element and the second clutch element.

In order to provide a compact design of the entire brake actuation mechanism, the first clutch element could at least in part radially surround the second clutch element, in which the latter is axially arranged closer to the brake disc. Both clutch elements coaxially surround the rod; therefore the first clutch element will comprise a bigger diameter than the second clutch element at least in the overlapping area, whereas it is ensured that the first clutch element will not come into radial contact with the second clutch element.

The torque limiting clutch mechanism could embody roller-ramp clutches or common friction clutches. Further designs such as teethed clutches or torsional springs could be embodied.

However, preferably, the first clutch element is configured as a wrap spring having an internal clutch surface being in contact with the input rotatable element and having an external clutch surface being in contact with the output rotatable element, the diameter of the external clutch surface being larger than the diameter of the internal clutch surface.

Furthermore, preferably, also the second clutch element is configured as a wrap spring having an internal clutch surface being in contact with the rod or with a component being rotationally fixed to the rod and an external clutch surface being in contact with the output rotatable element, the diameter of the external clutch surface being larger than the diameter of the internal clutch surface.

Since the first wrap spring is supported on the input rotatable element, which has a certain diameter, the second wrap spring will be supported on a distance sleeve being rotationally fixed to the rod. The distance sleeve enables that all components of the brake actuation mechanism will be mounted on the rod, since a fixation nut will be screwed onto a thread being provided at the brake disc-side end of the rod such that the fixation nut attaches to the face surface of the distance sleeve. In order to uncouple the unrotatable distance sleeve from the hollow shaft being rotatably supported on the rod, a washer or similar is arranged between these elements.

In the assembled state of the brake actuation mechanism, the output rotatable element or clutch sleeve itself is rotatably supported on the distance sleeve, so as to rotate together with the input rotatable element or hollow shaft.

The adjustment mechanism further comprises an adjustment spindle, which is in threaded engagement with a thrust element surrounding the adjustment spindle. The thrust element is nonrotatably but axially slideably guided within the caliper so that upon rotation of the spindle, the thrust element will advance towards the brake disc for clearance adjustment.

Accordingly, the rotation of the input rotatable element, which is transferred via the first clutch element to the output rotatable element, has to be further transferred to the adjustment spindle. For that purpose the clutch sleeve is rotationally connected to the adjustment spindle by means of a radial transmission device, which radial transmission device radially surrounds the clutch sleeve and which is configured to allow both rotational transmission and axial displacement between the adjustment spindle and the output rotatable element.

The radial transmission device comprises a radial inner support ring, which is rotationally fixed to the outer contour of the clutch sleeve, e.g. by means of a press-fit. It further comprises a radial outer support ring which is rotationally fixed to the inner contour of the adjustment spindle, e.g. by means of a splined connection.

Between the radial inner support ring and the radial outer support ring a roller bearing cage is enclosed. The bearing cage comprises balls or rollers being equidistantly arranged at the circumference of the cage. The balls are received in corresponding grooves of both the radial inner support ring and the radial outer support. By that it is possible that the radial inner support ring is slideably displaceably supported in relation to the radial outer support ring, while at the same time a rotational movement will be transmitted between the radial inner support ring or thus the clutch sleeve and the radial outer support ring or thus the adjustment spindle.

In order to enhance this radial transmission during brake actuation, so that the force flow during brake actuation, which is introduced by the lever directly or indirectly into the adjustment spindle and thus into the thrust element, will not be directed through the radial transmission device, the latter, namely the roller bearing cage, is axially supported by two low-friction bearing elements thereby embedding the radial transmission device. On one side the low-friction bearing element is supported against a component, which transmits the clamping force, as amplified by the amplification mechanism, directly into the adjustment spindle or an element being rotationally fixed thereto, whereas axially on the other side, the low-friction bearing is supported against an intermediate ring. On the opposite surface of that intermediate ring, preferably a coil spring of the return mechanism is axially supported. On its other free end the coil spring is received by an abutment cup, which is fixed on the rod at proper position by the fixation nut, which fixes the distance sleeve supporting the second wrap spring.

The adjustment spindle is configured as a hollow sleeve so as to be able to substantially contain most of the components of the brake actuation mechanism, in particular the entire torque limiting clutch mechanism, the radial transmission device and the reset or return mechanism with the coil spring.

Preferably, the first clutch element or first wrap spring is configured to allow rotation of the output rotatable element in both rotational directions during brake actuation and brake release, while at the same time the second clutch element or second wrap spring is being configured to allow rotation of the output rotatable element in one rotational direction only during brake actuation and brake release.

According to the invention the second wrap spring shall function as an extra one-way clutch being configured to stop any backward rotation of the adjustment mechanism, which normally would be caused in this direction of rotation by the non-zero torque of the first wrap spring having the double function, as described above.

Having such peculiar configuration in mind, therefore according to a second embodiment of the invention, a brake actuation mechanism for a disc brake comprising a brake caliper, which straddles at least one brake disc, is suggested which brake actuation mechanism comprises:

an amplification mechanism for amplifying a clamping force being introduced into the brake actuation mechanism;

an adjustment mechanism for compensating wear;

a thrust element for transmitting the amplified clamping force onto the brake disc; and a return mechanism;

in which the amplification mechanism, the adjustment mechanism, the thrust element and the return mechanism are mountable inside the housing of the brake caliper by means of a rod so as to be functionally interacting, the rod being adapted to be supported in the housing of the caliper in an axially fixed and non-rotatable manner; and in which the adjustment mechanism comprises a torque limiting clutch mechanism and elements being coaxially and rotatably arranged around the rod, which elements are at least partly drivingly connected by the torque limiting clutch mechanism; and in which the torque limiting clutch mechanism comprises a first wrap spring drivingly connecting a rotatable input element with a rotatable output element, the first wrap spring being configured to allow rotation of the rotatable output element in both rotational directions during brake actuation and brake release, and a second wrap spring connecting the rotatable output element with the rod, the second wrap spring being configured to allow rotation of the output rotatable element in one rotational direction only during brake actuation and brake release.

Basically, according to the invention, the second wrap spring, which serves as an additional one-way clutch spring, is configured as a double functioning spring in a similar way as the first wrap spring, i.e. it will be active on its inner contour at one end and active on its outer contour at the other end.

It shall be configured and arranged to allow itself to slip in the direction of the backward rotation only above a well determined torque, which torque has to be large enough to resist all undesired backward rotation, which could result from the first wrap spring, but which torque should be low enough to be easily overridden when there is a manual reset at pad replacement during maintenance.

Accordingly, it is crucial that the central rod has to be rotationally locked to the caliper housing of the disc brake or at least fixed to it in such a way which ensures that the rotational resistance against the caliper housing is always larger than the well determined slipping torque of the double functioning second wrap spring, which is used in the adjustment mechanism as the extra one-way clutch.

In detail, the first wrap spring comprises an internal clutch surface being in contact with the input rotatable element thereby forming an external clutch interface and an external clutch surface being in contact with the output rotatable element thereby forming an internal clutch interface, the internal clutch interface and the external clutch interface being configured to provide defined transmission torques such that in the rotational direction during brake actuation the transmission torque of the internal clutch interface is lower than the transmission torque of the external clutch interface and that in the other rotational direction during brake release the transmission torque of the external clutch interface is lower than the transmission torque of the internal clutch interface.

Alternatively, the first wrap spring could comprise an internal clutch surface being in contact with the input rotatable element thereby forming an external clutch interface and an external clutch surface being in contact with the output rotatable element thereby forming an internal clutch interface, the internal clutch interface and the external clutch interface being configured to provide defined transmission torques such that in the rotational direction during brake actuation the transmission torque of the internal clutch interface is larger than the transmission torque of the external clutch interface and that in the other rotational direction during brake release the transmission torque of the external clutch interface is larger than the transmission torque of the internal clutch interface.

With respect to the second wrap spring serving as the one-way clutch, the same comprises an internal clutch surface being in contact with the rod or with a component being rotationally fixed to the rod thereby forming an external clutch interface and an external clutch surface being in contact with the output rotatable element thereby forming an internal clutch interface, the internal clutch interface and the external clutch interface being configured to provide defined transmission torques such:

that in the rotational direction during brake actuation the transmission torque of the internal clutch interface is larger than the transmission torque of the external clutch interface and that in the rotational direction during brake actuation the transmission torque of the external clutch interface of the second wrap spring is lower than the respective lower transmission torque provided by the first wrap spring during brake actuation and that in the other rotational direction during brake release the transmission torque of the internal clutch interface as well as the transmission torque of the external clutch interface of the second wrap spring is larger than the respective lower transmission torque provided by the first wrap spring during brake release.

Alternatively, the second wrap spring could comprises an internal clutch surface being in contact with the rod or with a component being rotationally fixed to the rod thereby forming an external clutch interface and an external clutch surface being in contact with the output rotatable element thereby forming an internal clutch interface, the internal clutch interface and the external clutch interface being configured to provide defined transmission torques such:

that in the rotational direction during brake actuation the transmission torque of the internal clutch interface is lower than the transmission torque of the external clutch interface and that in the rotational direction during brake actuation the transmission torque of the internal clutch interface of the second wrap spring is lower than the respective lower transmission torque provided by the first wrap spring during brake actuation and that in the other rotational direction during brake release the transmission torque of the internal clutch interface as well as the transmission torque of the external clutch interface of the second wrap spring is larger than the respective lower transmission torque provided by the first wrap spring during brake release.

The respective transmission torques for the single clutch interfaces of the wrap springs can be set by individually determining the winding direction of the wire so that for a direction of rotation the coil at that section either will contract tending to wind the clutch down or expand tending to wind the clutch out. By carefully selecting several design details, such as the internal diameter and external diameter of the spring in relation to the outer diameter and inner diameter, respectively, of the element being connected to the spring, the number of coils to be engaged at a particular interface, the length of the respective interfaces and their surface finishes, and the shape and dimension of the wire for the coil, the diametrical interference fit between the coil section and the surface engaged thereby and thus the maximum torque limit and slip value can be varied as required in either direction of rotation. In other words, different desired values of torque transmitting capacities can be determined in both directions of rotation for each interface individually.

According to the present invention, the second wrap spring thus is to be selected to exclusively act as an one-way clutch which will stop any backward rotation of the adjustment mechanism which might be due to the non-zero torque of the first wrap spring in this backward direction of rotation, which is the free-running direction of this spring.

Beside this locking function during brake release, the second wrap spring in the brake release state also serves to prevent any undesired backward rotation of the adjustment spindle which may be caused by vibrations.

In the release state, forward rotations of the adjustment spindle, which may be caused by vibrations as well, are actually prevented by the first wrap spring and the second wrap spring together. In addition to the torque provided by the second wrap spring in this direction, the first wrap spring in its free running direction provides a torque acting via the hollow shaft and the lever connected by a drive pin therewith, which torque, however, is substantially larger than the one being provided by the second wrap spring in its free running direction.

Thus, the brake adjustment mechanism and the disc brake according to the invention provides for rotational locking against undesired backward rotation at brake release and against any rotations caused by vibrations. This is achieved without any extra friction resistance between threaded components of the adjustment mechanism or parts connected thereto, which would otherwise cause increased loads on components being involved in the adjusting process. In turn, this allows that all other components of the brake actuation mechanism and particular the adjustment mechanism incorporated therein can be designed and manufactured with lowest possible friction resistances. This will further reduce the required driving torque for adjustments and by that reduce the stress and thus failure risk for components being under load in this functional phase.

The brake actuation mechanism is therefore more reliable. Furthermore, it realizes a very compact design since all components being arranged around the central rod are more or less rotationally symmetric and can thus be manufactured in a very cost-effective way and since the clutch elements do spatially overlap without contacting each other and provide double functions. Furthermore, the rotatable output element, i.e. the clutch sleeve, which is rotationally connected to the adjustment spindle, serves as a radial outer clutch part for both the first wrap spring and the second wrap spring, providing an even more compact design of the entire brake actuation mechanism.

BRIEF DESCRIPTION OF THE DRAWINGS

Further advantages and features of the present invention do become apparent with respect to the embodiment as shown in the attached drawings, in which.

DETAILED DESCRIPTION OF THE INVENTION

The brake actuation mechanism according to the invention, which is to be received in the housing of a brake caliper of a disc brake, substantially comprises an amplification mechanism A, which introduces an actuating force originating from an hydraulic, pneumatic or electro-mechanical actuator (not shown herein) as a clamping force into the brake actuation mechanism and thereby enforcing it in correspondence with a gear ratio being determined by its construction, an adjustment mechanism B, which serves for compensation of brake lining wear, a thrust element C, which transmits the enforced clamping force onto the brake disc, and a reset device or return mechanism D in order to return the brake actuation mechanism in its starting position, in case no brake force is applied anymore by the actuator.

These above-mentioned assembly groups A, B, C and D are arranged on one central rod 1, which is aligned in parallel to the axis of the brake disc (not shown) The rod 1 serves as mounting means for the single assembly groups A, B, C and D of the brake actuation mechanism on the rod 1 itself on the one hand and as fixation means for the same in the housing of the brake caliper (not shown) on the other. With respect to the fixation of the rod 1 in the caliper housing it is referred to WO 2011/113554 A2 of the applicant. The rod 1 is stationary, i.e. it cannot rotate within the caliper.

The amplification mechanism A comprises a lever 2, which is pivotably supported in the rear housing section of the brake caliper in that it is rotatably supported against two rollers 3, which are placed eccentrically to the rotational axis of the lever 2. The cylindrical rollers 3 are rotatably received in a corresponding needle bearing cage 4, which is arranged in two support cups 5, in which the support cups 5 are supported in the rear housing section of the brake caliper. In doing so, the lever 2 is designed and configured in relation to the rollers 3 such that upon a pivoting movement around the rollers 3 an eccentric displacement of the lever 2 in relation to the rollers 3 takes place, which eccentric displacement or offset results in an enforcement of the force being introduced from the actuator into the lever 2.

Opposite to the rollers 3 the lever 2 is supported against a force-transmitting element 6 via further needle bearing cages 7, which force-transmitting element 6 comprises on the side towards the lever 2 two substantially half cup-type recesses which serve for receiving the needle bearing cages 7 and on the side towards the brake disc planar surfaces in order to interact with the adjustment mechanism B and thereby with the thrust element C.

For the passage of the central rod 2 the lever 3, the needle bearing cage 4 and the force-transmitting element 6 each comprise respective openings, whereas the support cups 5, the rollers 3 and the needle bearing cages 7 are arranged to both sides of the rod 1 at corresponding positions, respectively.

The adjustment mechanism B is provided directly following the amplification mechanism A in a direction towards the brake disc and includes a torque limiting clutch mechanism E, the design and mode of operation of which will be explained in the following.

On the rod 1, a rotatable input element 8 made as a hollow shaft is rotatably supported. The hollow shaft 8 comprises a drive pin 9 extending radially therefrom, which in the assembled state is received in a recess 10 in the lever 2 in such a way that upon swiveling motion of the lever 2 the hollow shaft 8 will be set into a rotation; in the present configuration a forward swiveling motion of the lever 2 will result, when seen from the rear of the rod 1, counterclockwise rotation of the hollow shaft 8.

Directly following the hollow shaft 8 in axial direction to the brake disc, a distance sleeve 11 is arranged on the rod 1. The distance sleeve 11 is rotationally fixed to the rod 1 so as to be stationary as well and is decoupled from the rotatable hollow shaft 8 by means of a slide washer 12.

A first clutch element or first wrap spring 13 is supported on the hollow shaft 8 via its internal clutch surface 13.1, which radially surrounds a section of the outer contour of the hollow shaft 8 thereby forming an external clutch interface 14. Axially at its other end the first wrap spring 13 is supported against a section of the inner contour of a rotatable output element or clutch sleeve 15 by means of its external clutch surface 13.2 thereby forming an internal clutch interface 16.

Similarly, a second clutch element or second wrap spring 17 is supported on the distance sleeve 11 via its internal clutch surface 17.1, which radially surrounds a section of the outer contour of the distance sleeve 11 thereby forming an external clutch interface 18. Axially at its other end the second wrap spring 17 is supported against a section of a further inner contour of the clutch sleeve 15 by means of its external clutch surface 17.2 thereby forming an internal clutch interface 19.

Figure 1:
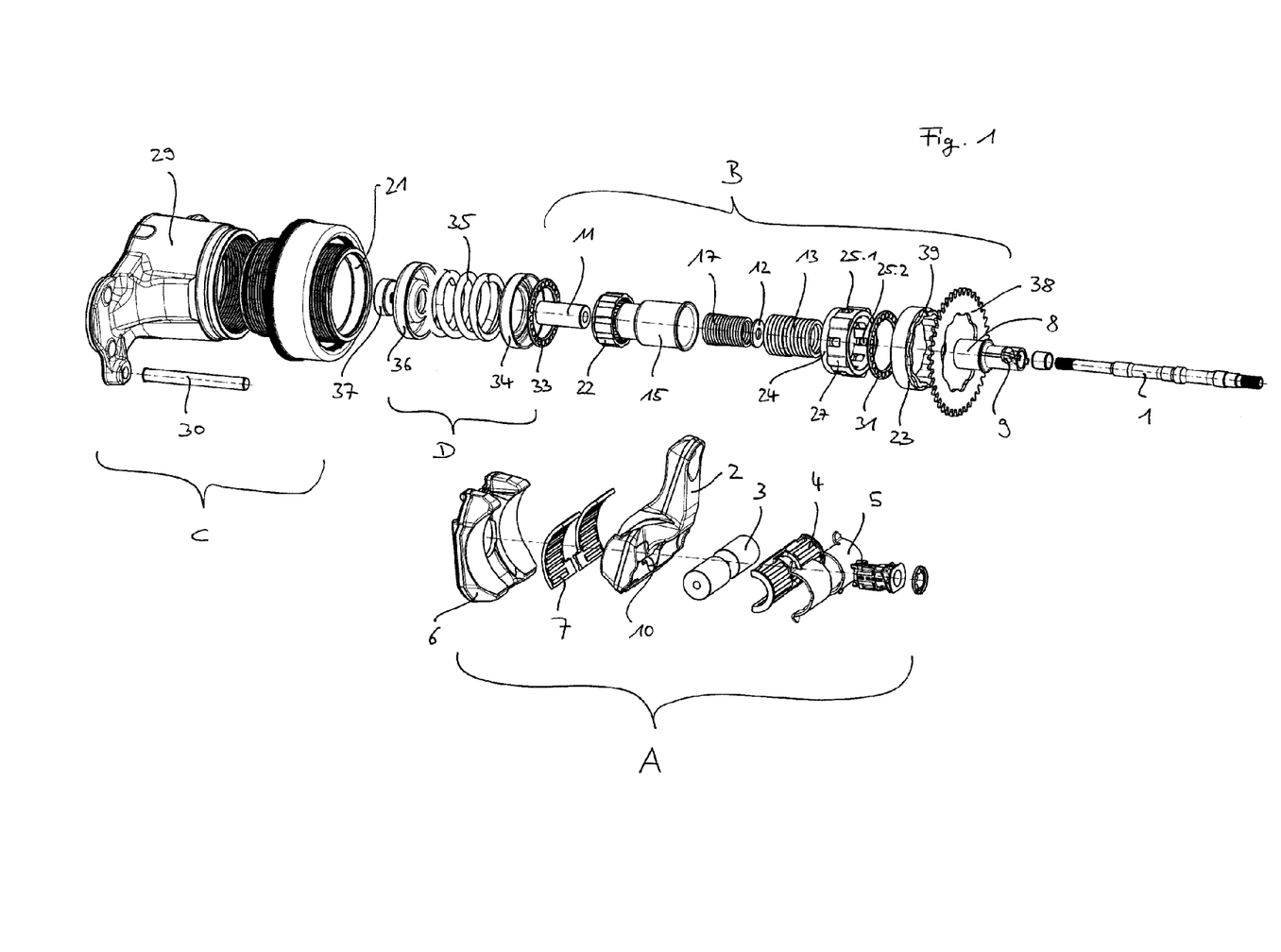
FIG. 1 is an explosive view of a brake actuation mechanism according to the invention.
Figure 2:
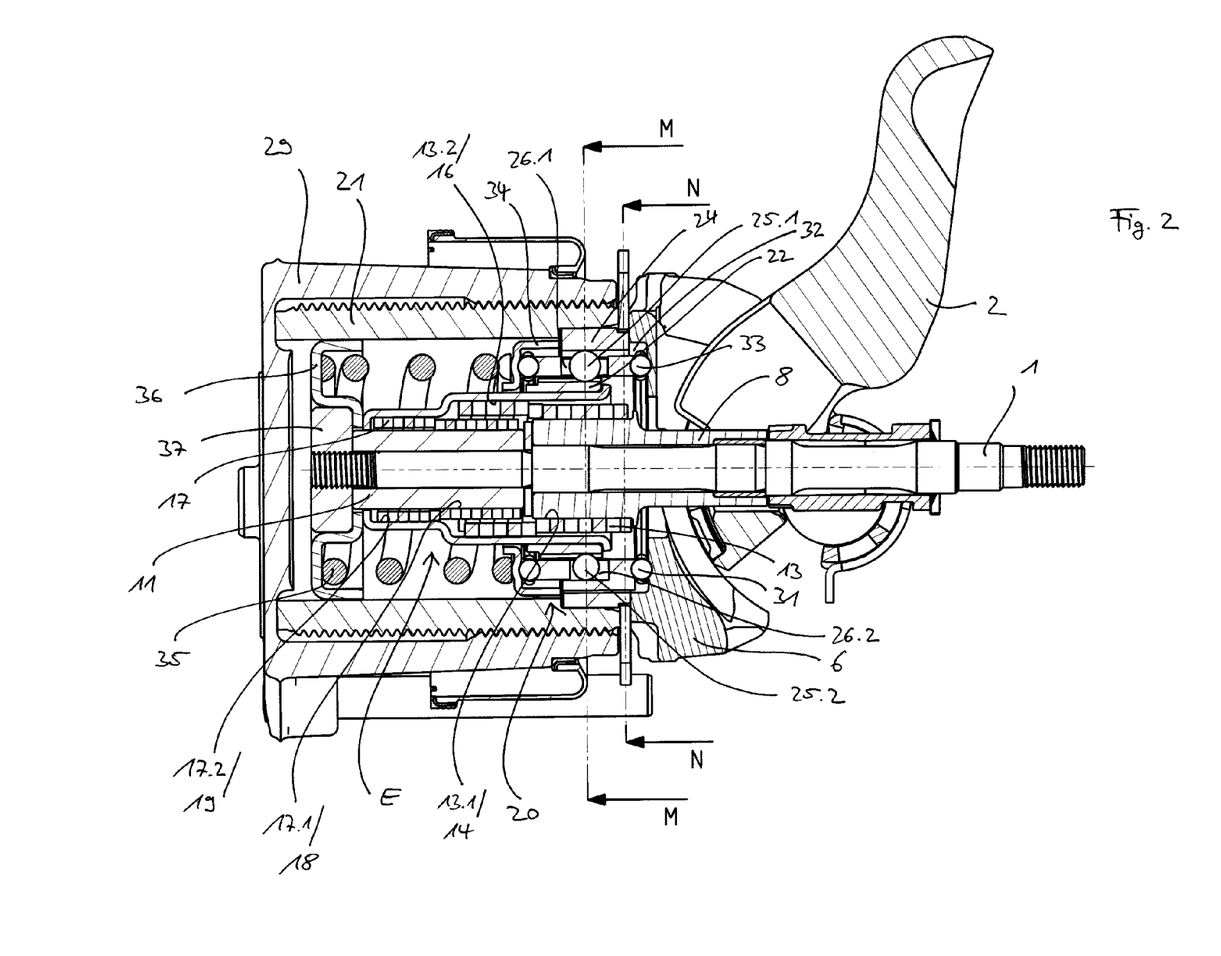
FIG. 2 is a cross-sectional view of the brake actuation mechanism according to the invention.

As can be particularly seen in FIG. 2, the clutch sleeve 15 surrounds or encases entirely the first wrap spring 13 and the second wrap spring 17, whereas the first wrap spring 13 with the section of its external clutch surface 13.2 overlaps the section of the internal clutch surface 17.1 of the second wrap spring 17. For both wrap springs 13 and 17, the diameter of their internal clutch surfaces 13.1 and 17.1, respectively, is smaller than the diameter of their external clutch surfaces 13.2 and 17.2, respectively. Accordingly, the clutch sleeve 15 is correspondingly shaped with different diameters.

It becomes apparent that by such specific design of the torque limiting clutch mechanism E a very compact design of the brake actuation mechanism can be achieved.

The rotatable output element or clutch sleeve 15 thus is rotatable supported via the two clutch elements 13 and 17 on the rod 1.

Furthermore, at the brake disc-side end the clutch sleeve 15 is directly rotatably supported on the distance sleeve 11. Axially opposite thereto, the clutch sleeve 15 is radially outwardly supported by a radial transmission device 20 against the inner contour of an adjustment screw or spindle 21. The radial transmission device 20 serves to transmit a rotation of the clutch sleeve 15 onto the adjustment spindle 21 upon adjustment during brake actuation.

For that purpose, the radial transmission device 20 comprises a radial inner support ring 22, which is rotationally fixed to the outer contour of the clutch sleeve 15 e.g. by means of a splined connection, press-fit or similar.

In a similar way a radial outer support ring 23 is rotationally fixed to the adjustment spindle 21, e.g. also by means of a splined connection, press-fit or similar.

The radial inner support ring 22 and the radial outer support ring 23 radially encase a roller bearing cage 24. The roller bearing cage 24 circumferentially comprises several rollers 25.1 being received in corresponding axial recesses 26.1 followed by longitudinal protrusions 27, when seen in axial direction, in an equidistant arrangement.

Figure 3A:
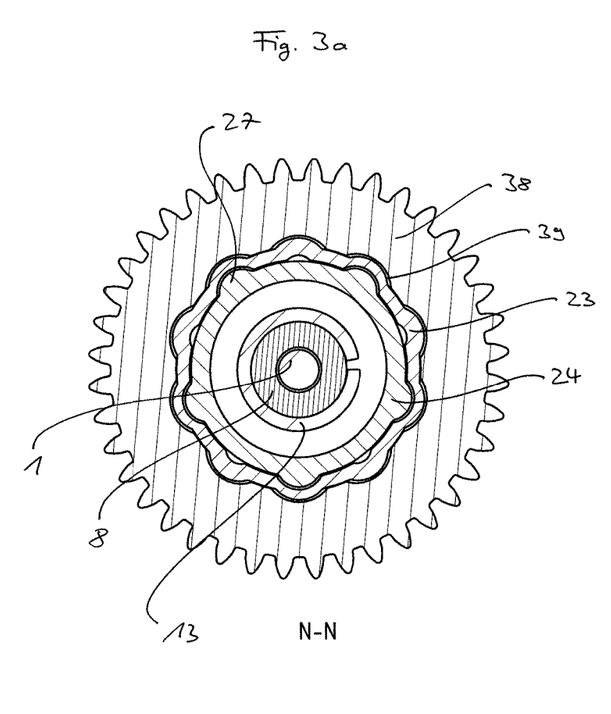
FIG. 3a is a section along N-N of FIG. 2.
Figure 3B:
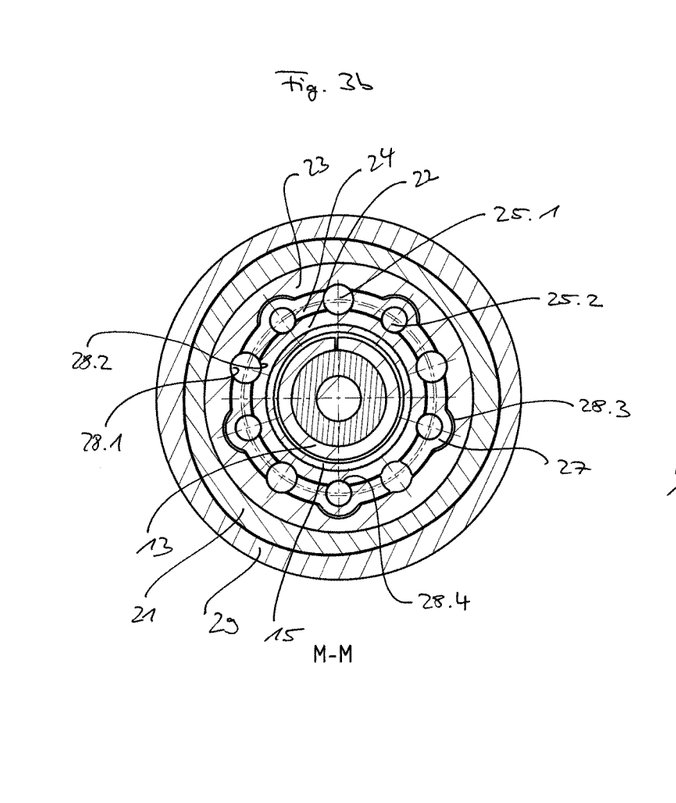
FIG. 3b is a section along M-M of FIG. 2.

As can be seen in FIG. 3b, the rollers 25.1 of the roller bearing cage ring 24 are slideably supported at corresponding grooves 28.1 and 28.2, which are equidistantly arranged and opposite to each other at the inner circumference of the radial outer support ring 23 and at the outer circumference of the radial inner support ring 22, respectively. By such rollers 25.1 of the radial transmission device 20, the clutch sleeve 15 is rotationally fixed to the adjustment spindle 21, so that a rotation of the clutch sleeve 15 will be transferred to the adjustment spindle 21, whereas both elements can be still axially displaced relative to each other. The rollers 25.1 will keep the radial inner support ring 22 and the radial outer support ring 23 in correct radial position.

In addition, the roller bearing cage 24 comprises rollers 25.2 received in recesses 26.2 being provided radially underneath the axial protrusions 27, which are located in corresponding grooves 28.3 at the radial inner circumference of the radial outer support ring 23 with some clearance. The rollers 25.2 themselves are received in grooves 28.4 of the radial outer surface of the inner radial support ring 22.

The adjustment spindle 21 is in threaded connection with a thrust piece 29 of the thrust element C, which thrust piece 29 is axially slideably but non-rotatably guided in the caliper, e.g. by a guide pin 30 being received in a corresponding bore (not shown) of the caliper, so that upon rotation of the adjustment spindle 21 the thrust piece 29 will advance towards the brake disc.

In axial direction the radial transmission device 20 is embedded by two low-friction bearing elements. One low-friction bearing element 31 is arranged between the roller bearing cage ring 24 and a recess 32 being provided in the brake-disc side surface of the force-transmitting element 6. Axially at the opposite side the roller bearing cage ring 24 is supported by a further low-friction bearing element 33 against an intermediate ring 34.

The intermediate ring 34 separates the radial transmission device 20 from the return mechanism D, namely from a return coil spring 35, which is arranged under a defined pretension between the intermediate ring 34 and an abutment cup 36.

In that the rollers 25.2, which are smaller than the rollers 25.1, are acting between the radial inner support ring 22 and the roller bearing cage 24 on the one hand and in that the roller bearing cage 24 is radially controlled in relation to the force-transmitting element 6 by the low-friction bearing 31, which is under substantial load from the return coil spring 35, on the other, the radial inner support ring 22 is radially controlled which in turn keeps the radial outer support ring 23 under radial control via the larger rollers 25.1. In summary, both radial support rings 22 and 23 and by that the clutch sleeve 15 and the adjustment spindle 21 are kept under radial control in relation to the force-transmitting element 6.

The abutment cup 36 will be fixed on the rod 1 by means of a fixation nut 37, which at the same time axially positions the distance sleeve 11.

At the side of the amplification mechanism A, the radial outer support ring 23 is rotationally fixed to a gear wheel 38 by means of a splined connection, as this can be seen from FIG. 3a. The gear wheel 38, which thus is also rotationally connected to the adjustment spindle 21 serves for a manual reset during pad replacement by an extra mechanism (not shown).

In the embodiment as shown in the figures, both the first wrap spring 13 and the second wrap spring 17 are coiled in the clockwise direction, when seen from the rear of the brake actuation mechanism.

During brake actuation including the adjustment process and during brake release the functioning of the brake actuation mechanism and the adjustment mechanism according to the invention is as follows.

In principle, the first wrap spring 13 is configured and designed to apply four different transmission torques:
  T(SA)14 is the transmission torque to be existent at the external clutch interface 14 during slack adjustment;
  T(SA)16 is the transmission torque to be existent at the internal clutch interface 16 during slack adjustment;
  T(BR)14 is the transmission torque to be existent at the external clutch interface 14 during brake release; and
  T(BR)16 is the transmission torque to be existent at the internal clutch interface during brake release.

Correspondingly, the second wrap spring 17 is configured and designed to apply the following four different transmission torques:
  t(SA)18 is the transmission torque to be existent at the external clutch interface 18 during slack adjustment;
  t(SA)19 is the transmission torque to be existent at the internal clutch interface 19 during slack adjustment;
  t(BR)18 is the transmission torque to be existent at the external clutch interface 18 during brake release; and
  t(BR)19 is the transmission torque to be existent at the internal clutch interface 19 during brake release.

During brake actuation, the lever 2 swivels forward towards the brake disc and transmits via the force-transmitting element 6, which in axial direction directly attaches to the gear wheel 38, and thus via the latter the clamping force into the adjustment spindle 21. By such swiveling motion, the entire adjustment mechanism B with the thrust element C advances towards the brake disc.

At the same time, the hollow shaft 8 will be set into rotation, since the drive pin 9 of it, which is received in the recess 10 of the lever 2, will be actuated by the swiveling motion of the lever 2 correspondingly. In the shown embodiment, the hollow shaft 8 thus will rotate on the rod 1 in a counter-clockwise direction, when seen from the rear of the brake actuation mechanism.

This rotation of the hollow shaft 8 is transferred via the first wrap spring 13 and the clutch sleeve 15 into the adjustment spindle 21, the rotation of which leads to the effect that the thrust piece 29 advances forward till the brake pad comes into force transmitting contact with the brake disc, so as to compensate the slack. At that time the first wrap spring 13 starts to slip so that no more rotation will be transferred from the hollow shaft 8 into the adjustment spindle 21.

For that purpose the first wrap spring 13 is configured in such a way so that the wire is right-hand winded and in which it is further designed so that during brake actuation, i.e. during slack adjustment, the transmission torque T(SA)14 at the external clutch interface 14 is larger than the transmission torque T(SA)16 at the internal clutch interface 16.

During brake release, i.e. when there will be a diminishing force applied onto the brake disc by the brake pad at the beginning and later when the brake pad loses the force transmitting contact with the brake disc, the lever 2 swivels backwards in response to the reset force applied by the return coil spring 35, which has been compressed during brake actuation, accordingly. Such backward swivel motion of the lever 2 will result in a clockwise rotation of the hollow shaft 8, when seen from the rear of the brake actuation mechanism. In order to keep the previously adjusted slack maintained for further braking, such rotation should be not transferred to the adjustment spindle 21, as it would again increase the clearance between the brake pad and the brake disc.

Thus, according to the invention, during brake release the transmission torque T(BR)16 at the internal clutch interface 16 has to be larger than the transmission torque T(BR)14 at the external clutch interface 14. In other words, upon backward movement of the brake actuation mechanism, the first wrap spring 13 will slip at its external clutch interface 14.

In summary, the first wrap spring 13 is configured to allow rotation of the clutch sleeve 15 in both rotational directions during brake actuation and brake release in relation to the hollow shaft 8, however, not in relation to the rod 1 or the caliper.

Since technically it cannot be avoided that the first wrap spring 13 will nevertheless apply some, albeit small torque during brake release due to its inherent non-zero torque, which would result in a minor counter rotation of the adjustment spindle 21, according to the invention the second wrap spring 17 is configured and designed to apply a corresponding blocking torque onto the clutch sleeve 15 during brake release.

In the shown embodiment, the second wrap spring 17 is configured to also comprise sections with a right-hand winded wire. The transmission torque t(SA)19 at the internal clutch interface 19 is larger than the transmission torque t(SA)18 of the external clutch interface 18, which at the same time is lower than the transmission torque T(SA)16 at the internal clutch interface 16 of the first wrap spring 13, so that during slack adjustment, until the brake pad comes into force transmitting contact with the brake disc, the external clutch interface 18 will slip.

In order to block any tendency of backward rotation possibly introduced by the first wrap spring 13 during brake release, the second wrap spring 17 is further configured and designed so that the transmission torque t(BR)18 of the external clutch interface 18 and the transmission torque t(BR)19 of the internal clutch interface 19, respectively, are larger than the transmission torque T(BR)14 of the external clutch interface 14 of the first wrap spring 13.

As defined in the appended claims, the different transmission torques at the different clutch interfaces of the two wrap springs 13 and 17 can be varied individually to realize the desired double functioning, considering the direction of rotation of the drive pin 9 on the one hand and the winding direction of the wire on the other.

Accordingly, as this can not be directly derived from the figures, which only show the structural configuration of the embodiment, the following further functional configurations are possible.

If during slack adjustment (i.e. during brake actuation) for the first wrap spring 13 the transmission torque T(SA)14 at the external clutch interface 14 is larger than the transmission torque T(SA)16 at the internal clutch interface 16 (and during brake release the transmission torque T(BR)16 at the internal clutch interface 16 is larger than the transmission torque T(BR)14 at the external clutch interface 14) and if during slack adjustment for the second wrap spring 17 the transmission torque t(SA)18 at the external clutch interface 18 is larger than the transmission torque t(SA)19 at the internal clutch interface 19, then during slack adjustment the transmission torque t(SA)19 at the internal clutch interface 19 of the second wrap spring 17 has to be smaller than the transmission torque T(SA)16 at the internal clutch interface 16 of the first wrap spring 13 and at the same time during brake release the transmission torque t(BR)18 at the external clutch interface 18 as well as the transmission torque t(BR)19 at the internal clutch interface 19 of the second wrap spring 17 has to be larger than the transmission torque T(BR)14 at the external clutch interface 14 of the first wrap spring 13.

In a further alternative, if during slack adjustment for the first wrap spring 13 the transmission torque T(SA)16 at the internal clutch interface 16 is larger than the transmission torque T(SA)14 at the external clutch interface 14 (and during brake release the transmission torque T(BR)14 at the external clutch interface 14 is larger than the transmission torque T(BR)16 at the internal clutch interface 16) and if during slack adjustment for the second wrap spring 17 the transmission torque t(SA)18 at the external clutch interface 18 is larger than the transmission torque t(SA)19 at the internal clutch interface 19, then during slack adjustment the transmission torque t(SA) 19 at the internal clutch interface 19 of the second wrap spring 17 has to be smaller than the transmission torque T(SA)14 at the external clutch interface 14 of the first wrap spring 13 and at the same time during brake release the transmission torque t(BR)18 at the external clutch interface 18 as well as the transmission torque t(BR) 19 at the internal clutch interface 19 of the second wrap spring 17 has to be larger than the transmission torque T(BR)16 at the internal clutch interface 16 of the first wrap spring 13.

According to a still further alternative, if during slack adjustment for the first wrap spring 13 the transmission torque T(SA)16 at the internal clutch interface 16 is larger than the transmission torque T(SA)14 at the external clutch interface 14 (and during brake release the transmission torque T(BR)14 at the external clutch interface 14 is larger than the transmission torque T(BR)16 at the internal clutch interface 16) and if during slack adjustment for the second wrap spring 17 the transmission torque t(SA)19 at the internal clutch interface 19 is larger than the transmission torque t(SA)18 at the external clutch interface 18, then during slack adjustment the transmission torque t(SA)18 at the external clutch interface 18 of the second wrap spring 17 has to be smaller than the transmission torque T(SA)14 at the external clutch interface 14 of the first wrap spring 13 and at the same time during brake release the transmission torque t(BR)18 at the external clutch interface 18 as well as the transmission torque t(BR)19 at the internal clutch interface 19 of the second wrap spring 17 has to be larger than the transmission torque T(BR)16 at the internal clutch interface 16 of the first wrap spring 13.

From the above, it becomes apparent that according to the invention the major adjustment function on the one hand and the locking against undesired backward rotations during brake release and against vibration-induced rotations on the other are realized and performed by only four rotating components: the hollow shaft 8 acting as a rotatable input element being connected to the lever 2, the first wrap spring 13 having a double function as described above, the second wrap spring 17 having a locking function and the clutch sleeve 15 acting as a rotatable output element being connected to and interacting with both wrap springs 13 and 17 differently in response to each direction of rotation, respectively.

REFERENCE NUMERALS

A Amplification mechanism
B Adjustment mechanism
C Thrust element
D Return mechanism
E Torque limiting clutch mechanism
1 Rod
2 Lever
3 Rollers
4 Needle bearing cage
5 Support cups
6 Force transmitting element
7 Needle bearing cage
8 Rotatable input element/Hollow shaft
9 Drive pin
10 Recess
11 Distance sleeve
12 Washer
13 First clutch element/First wrap spring
13.1 Internal clutch surface
13.2 External clutch surface
14 External clutch interface
15 Rotatable output element/Clutch sleeve
16 Internal clutch interface
17 Second clutch element/Second wrap spring
17.1 Internal clutch surface
17.2 External clutch surface
18 External clutch interface
19 Internal clutch interface
20 Radial transmission device
21 Adjustment spindle
22 Radial inner support ring
23 Radial outer support ring
24 Roller bearing cage
25.1 Rollers
25.2 Rollers
26.1 Recess
26.2 Recess
27 Protrusions
28.1 Grooves
28.2 Grooves
28.3 Grooves
28.4 Grooves
29 Thrust piece
30 Guide pin
31 Low-friction bearing element
32 Recess
33 Low-friction bearing element
34 Intermediate ring
35 Return coil spring
36 Abutment cup
37 Fixation nut
38 Gear wheel
39 Splined connection
T(SA)14 transmission torque at external clutch interface 14 during slack adjustment
T(SA)16 transmission torque at internal clutch interface 16 during slack adjustment
T(BR)14 transmission torque at external clutch interface 14 during brake release
T(BR)16 transmission torque at internal clutch interface 16 during brake release
t(SA)18 transmission torque at external clutch interface 18 during slack adjustment
t(SA)19 transmission torque at internal clutch interface 19 during slack adjustment
t(BR)18 transmission torque at external clutch interface 18 during brake release
t(BR)19 transmission torque at internal clutch interface 19 during brake release

The invention claimed is:

1. A brake actuation mechanism for a disc brake comprising a brake caliper, which straddles at least one brake disc, the brake actuation mechanism comprising:
an amplification mechanism for amplifying a clamping force being introduced into the brake actuation mechanism;
an adjustment mechanism for compensating wear;
a thrust element for transmitting the amplified clamping force onto the brake disc; and
a return mechanism;
in which the amplification mechanism, the adjustment mechanism, the thrust element and the return mechanism are mountable inside the housing of the brake caliper by means of a rod so as to be functionally interacting, the rod being adapted to be supported in the housing of the caliper in an axially fixed and non-rotatable manner; and
in which the adjustment mechanism comprises a torque limiting clutch mechanism and elements being coaxially and rotatably arranged around the rod, which elements are at least partly drivingly connected by the torque limiting clutch mechanism;
characterized in that
the torque limiting clutch mechanism comprises a first clutch element drivingly connecting a rotatable input element with a rotatable output element and a second clutch element connecting the rotatable output element with the rod, the rotatable output element radially surrounding the first clutch element and the second clutch element.

2. The brake actuation mechanism according to claim 1, in which the first clutch element at least in part radially surrounds the second clutch element.

3. The brake actuation mechanism according to claim 1, in which the first clutch element is configured as a wrap spring having an internal clutch surface being in contact with the input rotatable element and having an external clutch surface being in contact with the output rotatable element, the diameter of the external clutch surface being larger than the diameter of the internal clutch surface.

4. The brake actuation mechanism according to claim 1, in which the second clutch element is configured as a wrap spring having an internal clutch surface being in contact with the rod or with a component being rotationally fixed to the rod and an external clutch surface being in contact with the output rotatable element, the diameter of the external clutch surface being larger than the diameter of the internal clutch surface.

5. The brake actuation mechanism according to claim 4, in which the second clutch element is supported on a distance sleeve being rotationally fixed to the rod and in which the output rotatable element is being rotatable supported on the distance sleeve.

6. The brake actuation mechanism according to claim 1, in which the adjustment mechanism further comprises an adjustment spindle, and in which the output rotatable element is rotationally connected to the adjustment spindle by means of a radial transmission device, which radial transmission device is configured to allow rotational transmission and axial displacement between the adjustment spindle and the output rotatable element.

7. The brake actuation mechanism according to claim 6, in which the radial transmission device is axially supported by two low-friction bearing elements thereby embedding the radial transmission device.

8. The brake actuation mechanism according to claim 6, in which the return mechanism is supported against the radial transmission device.

9. The brake actuation mechanism according to claim 6, in which the adjustment spindle is hollow and contains the torque limiting clutch mechanism, the radial transmission device and the return mechanism.

10. The brake actuation mechanism according to claim 1, in which the first clutch element is configured to allow rotation of the output rotatable element in both rotational directions during brake actuation and brake release.

11. The brake actuation mechanism according to claim 1, in which the second clutch element is being configured to allow rotation of the output rotatable element in one rotational direction only during brake actuation and brake release.

12. A disc brake comprising a brake actuation mechanism according to claim 1.

13. A brake actuation mechanism for a disc brake comprising a brake caliper, which straddles at least one brake disc, the brake actuation mechanism comprising:
an amplification mechanism for amplifying a clamping force being introduced into the brake actuation mechanism;
an adjustment mechanism for compensating wear;
a thrust element for transmitting the amplified clamping force onto the brake disc; and
a return mechanism;
in which the amplification mechanism, the adjustment mechanism, the thrust element and the return mechanism are mountable inside the housing of the brake caliper by means of a rod so as to be functionally interacting, the rod being adapted to be supported in the housing of the caliper in an axially fixed and non-rotatable manner; and
in which the adjustment mechanism comprises a torque limiting clutch mechanism and elements being coaxially and rotatably arranged around the rod, which elements are at least partly drivingly connected by the torque limiting clutch mechanism;
characterized in that
the torque limiting clutch mechanism comprises a first wrap spring drivingly connecting a rotatable input element with a rotatable output element, the first wrap spring being configured to allow rotation of the rotatable output element in both rotational directions during brake actuation and brake release, and a second wrap spring connecting the rotatable output element with the rod, the second wrap spring being configured to allow rotation of the output rotatable element in one rotational direction only during brake actuation and brake release.

14. The brake actuation mechanism according to claim 13, in which the first wrap spring comprises an internal clutch surface being in contact with the input rotatable element thereby forming an external clutch interface and an external clutch surface being in contact with the output rotatable element thereby forming an internal clutch interface, the internal clutch interface and the external clutch interface being configured to provide defined transmission torques such that in the rotational direction during brake actuation the transmission torque of the internal clutch interface is lower than the transmission torque of the external clutch interface and that in the other rotational direction during brake release the transmission torque of the external clutch interface is lower than the transmission torque of the internal clutch interface.

15. The brake actuation mechanism according to claim 14, in which the second wrap spring comprises an internal clutch surface being in contact with the rod or with a component being rotationally fixed to the rod thereby forming an external clutch interface and an external clutch surface being in contact with the output rotatable element thereby forming an internal clutch interface, the internal clutch interface and the external clutch interface being configured to provide defined transmission torques such:
that in the rotational direction during brake actuation the transmission torque of the internal clutch interface is larger than the transmission torque of the external clutch interface and
that in the rotational direction during brake actuation the transmission torque of the external clutch interface of the second wrap spring is lower than the respective lower transmission torque provided by the first wrap spring during brake actuation and
that in the other rotational direction during brake release the transmission torque of the internal clutch interface as well as the transmission torque of the external clutch interface of the second wrap spring is larger than the respective lower transmission torque provided by the first wrap spring during brake release.

16. The brake actuation mechanism according to claim 14, in which the second wrap spring comprises an internal clutch surface being in contact with the rod or with a component being rotationally fixed to the rod thereby forming an external clutch interface and an external clutch surface being in contact with the output rotatable element thereby forming an internal clutch interface, the internal clutch interface and the external clutch interface being configured to provide defined transmission torques such:
that in the rotational direction during brake actuation the transmission torque of the internal clutch interface is lower than the transmission torque of the external clutch interface and
that in the rotational direction during brake actuation the transmission torque of the internal clutch interface of the second wrap spring is lower than the respective lower transmission torque provided by the first wrap spring during brake actuation and
that in the other rotational direction during brake release the transmission torque of the internal clutch interface as well as the transmission torque of the external clutch interface of the second wrap spring is larger than the respective lower transmission torque provided by the first wrap spring during brake release.

17. The brake actuation mechanism according to claim 13, in which the first wrap spring comprises an internal clutch surface being in contact with the input rotatable element thereby forming an external clutch interface and an external clutch surface being in contact with the output rotatable element thereby forming an internal clutch interface, the internal clutch interface and the external clutch interface being configured to provide defined transmission torques such that in the rotational direction during brake actuation the transmission torque of the internal clutch interface is larger than the transmission torque of the external clutch interface and that in the other rotational direction during brake release the transmission torque of the external clutch interface is larger than the transmission torque of the internal clutch interface.

18. The disc brake comprising a brake actuation mechanism according to claim 13.

* * * * *